United States Patent [19]

Sukup

[11] Patent Number: 5,224,551
[45] Date of Patent: Jul. 6, 1993

[54] GUIDANCE SYSTEM CONTROL

[75] Inventor: Charles E. Sukup, Dougherty, Iowa

[73] Assignee: Sukup Manufacturing Company, Sheffield, Iowa

[21] Appl. No.: 708,343

[22] Filed: May 31, 1991

[51] Int. Cl.⁵ .......................................... A01B 63/102
[52] U.S. Cl. ............................................ 172/6; 172/2; 180/131; 104/244.1
[58] Field of Search ....................... 172/5, 6, 2, 26, 4.5; 104/244.1; 180/131

[56] References Cited

U.S. PATENT DOCUMENTS

| | | |
|---|---|---|
| 3,251,582 | 5/1966 | Murphy . |
| 3,732,932 | 5/1973 | Taube ..................... 172/7 |
| 3,736,988 | 6/1973 | Cantral et al. ........... 172/7 |
| 3,805,798 | 4/1974 | Girodat ................ 56/10.2 X |
| 3,876,012 | 4/1975 | Regier ............... 172/4.5 X |
| 3,946,825 | 3/1976 | Gail ................... 56/10.2 X |
| 3,952,828 | 4/1976 | Stampfer et al. ........... 180/97 |
| 4,211,057 | 7/1980 | Dougherty et al. ......... 56/10.2 |
| 4,219,093 | 8/1980 | Lang ...................... 180/131 |
| 4,228,860 | 10/1980 | Orthman ................. 172/26 |
| 4,261,161 | 4/1981 | Colgrove et al. .......... 56/10.2 |
| 4,463,811 | 8/1984 | Winter ..................... 172/26 |
| 4,490,965 | 1/1985 | Hutchison ............... 56/11.6 |
| 4,515,221 | 5/1985 | van der Lely ............. 172/3 |

OTHER PUBLICATIONS

Scout Guidance System Operator's Manual for Model 470 Series by Buffalo Farm Equipment, Fleischer Manufacturing, Inc., Columbus, Nebr.
Sukup Auto Guide Owner's Parts and Instruction Manual by Sukup Manufacturing Company, Sheffield, Iowa.
Acura Trak Guidance Control brochure entitled "Pioneering Guidance Control Technology for Today's Precision Farmer" by Sunco Marketing, North Platte, Nebr.
The Buffalo Scout brochure entitled "The Ultimate Guidance System For Your Cultivator Or Planter" by Fleischer Mfg. Inc., Columbus, Nebr.
The Navigator Row Crop Guidance System brochure entitled "Stay In Line Automatically . . . With The Navigator" by HR Manufacturing Co., Pender, Nebr.
The Navigator Row Crop Guidance brochure entitled "#1 In Row Crop Guidance" by HRManufacturing Co., Pender, Nebr.
The Guide Side Shifter and Steering Quick Hitch Owner's Manual by Lincoln Creek Manufacturing, Phillips, Nebr.
The Wethrell Guide Hitch Operator's Manual and Parts Book by Wetherell Mfg. Co., Cleghorn, Iowa.

Primary Examiner—Dennis L. Taylor
Assistant Examiner—Spencer Warnick
Attorney, Agent, or Firm—Leydig, Voit & Mayer

[57] ABSTRACT

A switch assembly which is attached to a portion of the agricultural tractor and implement combination in order to control operation of a guidance system. The switch assembly includes a switch, a switch support assembly, an attachment assembly, and an adjustment assembly. The switch is a mercury tilt switch which is designed for horizontal mounting. The switch is activated when tilted above the horizontal and is deactivated when tilted below the horizontal. The switch assembly is mounted to the hitch system of an agricultural tractor. When the operator raises the hitch system, the mercury switch automatically switches the control system from the automatic mode to the manual mode. When the operator lowers the hitch system, the mercury switch automatically switches the control system from the manual mode to the automatic mode. The switch is sealed to prevent dirt and debris from interfering with the operation of the switch.

26 Claims, 2 Drawing Sheets

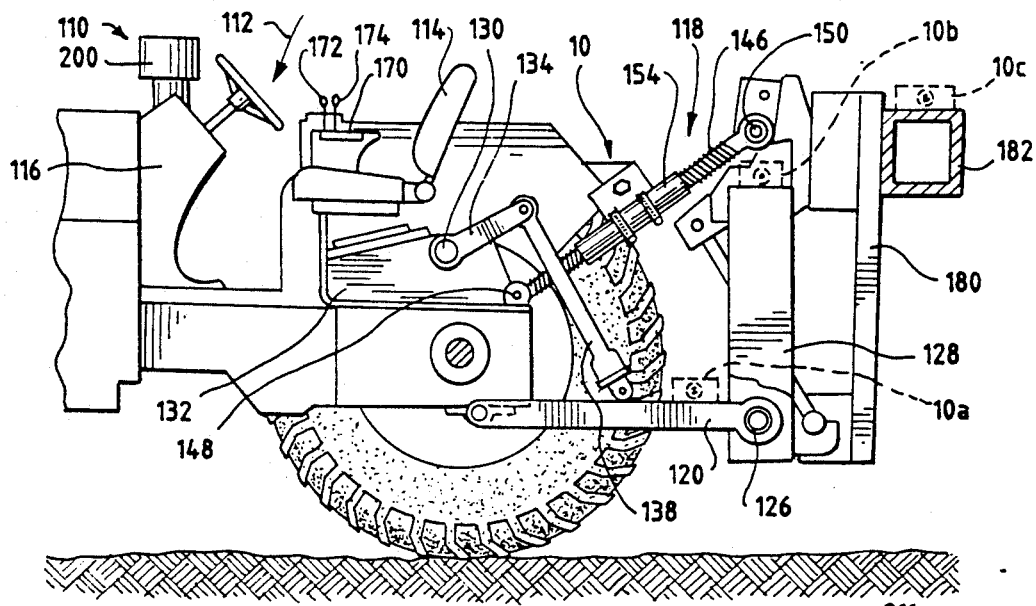
Fig. 5
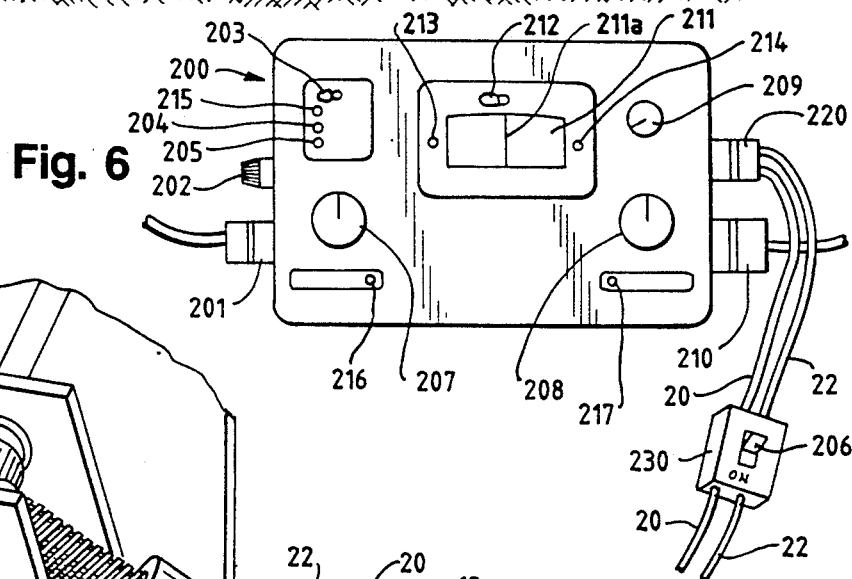
Fig. 6
Fig. 7
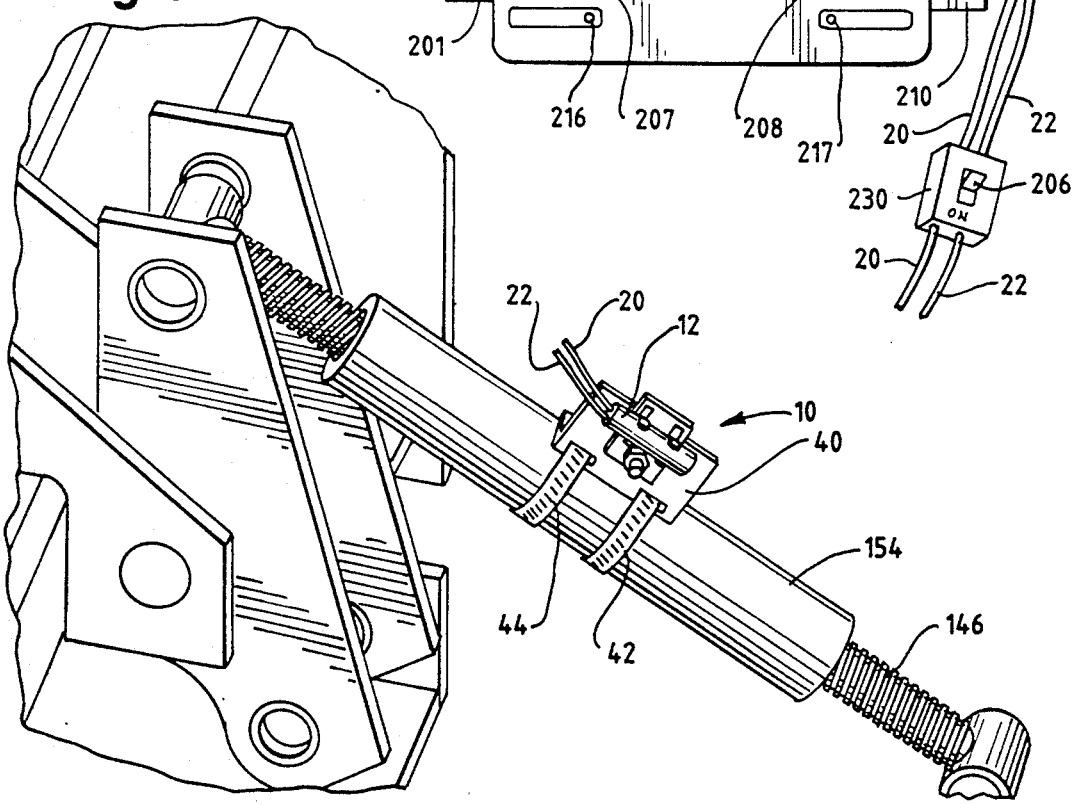

1

GUIDANCE SYSTEM CONTROL

BACKGROUND OF THE INVENTION

This invention relates to an automated control for a guidance system in order to control operation of a guidance control system.

Guidance systems frequently are used to assist an operator in guiding an agricultural implement in the field. Basically, the guidance system uses some type of sensing means, such as sensing wands, which sense the position of the crop relative to the implement. The guidance system also has a guidance mechanism which adjusts the position of the implement relative to the tractor so that the position of the implement corresponds to the position of the crop. The guidance function can be performed in many ways, but may be performed by adjusting the angle of the implement relative to the longitudinal axis or direction of travel of the agricultural tractor. While the implement is travelling through the field, the position of the crop relative to the implement will change. In order to correct this deviation, the guidance system will adjust the angle of the implement relative to the tractor.

Many agricultural tractors have a three-point hitch system located at the rear of the tractor. The three-point hitch is designed to connect an implement to the tractor and permit the tractor to raise and lower the implement. In normal operation, the operator lowers the implement in order to effect the specific agricultural operation. When the operator reaches the end of the field, he normally raises the implement and turns the vehicle so that he can begin the next pass down the field. After turning the vehicle at the end of the field, the operator then lowers the implement to begin the next pass down the field.

When the operator is using a guidance system and reaches the end of the field, the operator raises the implement and switches the guidance system to the manual mode which can position the implement into a center position behind the vehicle. If the operator does not switch the guidance system, the guidance mechanism usually causes the implement to move relative to the tractor due to the swaying of the wands as the tractor is turned at the end of the field. In addition, it is advantageous for the guidance mechanism to be centered when starting the next pass down the field. After the operator has turned the tractor and the implement, the operator lowers the implement. The operator then manually switches the guidance system to the automatic mode for the next pass through the field.

A problem is that it is inconvenient for the operator to switch the guidance system when the operator is turning the tractor at the end of the field. The operator is performing many tasks when the operator is turning at the end of the field, such as, moving hydraulic levers, turning the steering wheel, aligning the tractor and implement for the next pass down the field, watching for obstacles and avoiding the fence at the end of the field. Thus, the operator is performing many tasks and the turning operation would be simpler, easier, and more convenient if the operator did not need to manually switch the guidance system.

Another problem is that the operator may forget to switch the guidance system to the manual mode when the operator reaches the end of the field. When the operator raises the implement and turns the tractor and implement combination, the sensing means or sensing wands will swing or move due to the rough field conditions at the end of the field. This movement of the sensing wands will cause the guidance mechanism to move in response to the movement of the sensing wands. Furthermore, this movement of the guidance mechanism and the implement reduces the stability of the tractor during the turn. This unnecessary movement of the hitch mechanism can cause premature wear in the hitch mechanism and could possibly damage the hitch mechanism.

Another problem which may occur is when the operator fails to switch the guidance system when the operator begins the next pass down the field after completing the turn at the end of the field. For example, the operator may remember to switch the guidance system to the manual mode before beginning the turn at the end of the field. However, after completing the turn, the operator may forget to switch the guidance system to the automatic mode. Therefore, the operator will lower the implement and begin the agricultural operation without the benefit of the guidance system. Consequently, if the operator is using the guidance system with a cultivator, the cultivator may destroy portions of the crop rows before the operator discovers that the guidance system is not in the automatic mode. In addition, if the operator is using the guidance system with a planter, the operator may not achieve the correct spacing of the rows with respect to previous sets of rows. This improper spacing of the rows can result in further complications during cultivation or harvesting.

An additional reason for switching the guidance system from the automatic mode to the manual mode at the end of the field is to equalize or center the hitch mechanism. The guidance system will operate more efficiently if the hitch mechanism is in the center position when the operator begins the next pass down the field. When the hitch mechanism is in the center position, the implement is parallel to the hitch system of the tractor. By having the hitch mechanism in the center position when the operator begins a pass down the field, the guidance mechanism is able to use the complete freedom of movement of the guidance mechanism. If the guidance mechanism is not in the center position when beginning a pass down the field, the hitch mechanism may be limited in its ability to make corrections due to a predisposition of the hitch mechanism.

In one guidance system which is presently available, the sensing mechanism contains a micro-switch to automatically switch the control system. In this design, the micro-switch is located in the sensing wand assembly. When the implement and the attached wand assembly are raised, the sensing wands rotate downwards due to gravity and depress the micro-switch. When the micro-switch is depressed, a signal is sent to the control box which switches the guidance system to center the guidance mechanism. When the implement is lowered, the sensing wands engage the ground and the micro-switch is released.

This micro-switch design has several problems. First, the switch assembly is located near the ground and it subject to contamination by dirt and other debris which would cause the micro-switch to malfunction Second, the micro-switch assembly could malfunction if debris, such as crop residue, interferes with the plunger or contact arm on the micro-switch.

Third, this micro-switch assembly requires that the sensing wands contact the ground in order for the micro-switch assembly to function properly. However, some sensing assemblies only contact the crops and not the ground in order to sense the position of the crop row. Sensing assemblies which only sense the position of the crops are more sensitive and more accurately sense the position of the crop row. Therefore, a micro-switch assembly cannot be used on sensing assemblies which only sense the crops because these sensing assemblies normally do not contact the ground Since the micro-switch relies upon contact with the ground in order to function, the micro-switch cannot be used with sensing assemblies which do not contact the ground Finally, when the micro-switch assembly is located in the sensing assembly, it is difficult an tedious to adjust the micro-switch assembly so that it activates and deactivates the control system at the appropriate position.

SUMMARY OF THE INVENTION

In the present invention the aforementioned problems are solved through the use of an automated control for a guidance system in order to automatically switch between the automatic mode and manual mode of the guidance control system.

The switch assembly includes a switch, a switch support assembly, an attachment assembly and an adjustment assembly. The switch is a mercury tilt switch which is designed for horizontal mounting. The switch is activated when tilted above the horizontal to its "make" angle. The switch is deactivated when tilted below the horizontal to its "break" angle. The mercury switch is sealed in an insulated plastic case. This plastic case prevents the switch from being contaminated by dirt or other debris. Although this particular embodiment utilizes a mercury switch, other switches such as tilt or position switches could be used.

The switch support assembly includes a mounting clip and a support bracket. The mounting clip has a U-shaped configuration with four legs which extend outward from the clip and grasp the outer perimeter of the mercury switch. The mounting clip is spot welded or otherwise attached to the support bracket. The support bracket has a U-shaped slot in the bottom of the bracket for easy assembly.

The attachment assembly includes a clamp bracket, a first hose clamp, and a second hose clamp. The clamp bracket has an L-shaped configuration with an upright leg and a base portion. The clamp bracket also contains a first slot and a second slot for accepting the first hose clamp and the second hose clamp respectively.

The adjustment assembly includes a bolt, a hex nut, a first flat washer, a second flat washer, and a top-lock nut. The bolt is inserted into a circular aperture in the clamp bracket and the hex nut is threaded onto the bolt and holds the bolt to the clamp bracket. The first flat washer and second flat washer are inserted onto the bolt and the support is sandwiched between the two flat washers. The top-lock nut is then threaded onto the bolt and tightened to hold the support bracket in position.

The switch assembly is mounted to the upper link of the three-point hitch on an agricultural tractor. Specifically the clamp bracket is clamped to the turnbuckle of the upper link with the first hose clamp and the second hose clamp. The clamp bracket should be installed vertically in order to insure proper operation of the mercury switch The switch assembly can also be attached to other portions of the three-point hitch including one of the lower links. Furthermore, the switch assembly could be attached to a portion of the guidance mechanism or to a portion of the implement.

The switch assembly will switch the guidance system between the automatic mode and the manual mode. When the guidance system is in the automatic mode, the guidance mechanism would adjust the position of the implement in response to the movement of the sensing wands. When the guidance system is in the manual mode, the guidance mechanism would adjust the position of the implement in response to the position or movement of the manual knob on the control box of the guidance system.

The switch assembly operates in the following manner. When the operator reaches the end of the field, the operator raises the three-point hitch, including the guidance mechanism and the implement, by adjusting a lever in the operator station on the tractor. As the three-point hitch raises the guidance mechanism and the attached implement, the angle of the switch assembly changes. When the three-point hitch is approximately halfway between the full-up and full-down positions, the mercury switch automatically switches the control system from the automatic mode to the manual mode.

After the operator has turned the tractor and the implement, the operator lowers the three-hitch, including the attached guidance mechanism and the implement, by adjusting the lever at the operator's station. When the three-point hitch is approximately halfway between full-up and full-down position, the mercury switch automatically switches the guidance system to the manual mode to automatic mode to begin the next pass through the field. The operator may use the override switch to override the automatic mode so that the control system will only operate in the manual mode.

If the operator needs to change the position at which the control system switches from the automatic mode to the manual mode, the operator simply loosens the lock nut and changes the mounting position of the mercury switch to the appropriate angle. The operator then tightens the lock nut to maintain the mercury switch in the appropriate position.

One object of this invention is to provide a switching assembly which automatically activates and deactivates the operation of a guidance control system when the implement is raised or lowered.

Another object of this invention is to provide a switching assembly which is reliable and will not malfunction due to contamination by dirt or debris.

An additional object of this invention is to provide a switching assembly which will operate without potential interference from crop residue or other debris.

Moreover, another object of this invention is to provide a switch assembly which will operate with crop sensing devices which do not contact the ground.

Finally, another object of this invention is to provide a switch assembly which is easy to adjust.

Other objects and advantages of the invention will become apparent upon reading the following detailed description and appended claims, and upon reference to the accompanying drawings.

BRIEF DESCRIPTION OF THE DRAWINGS

For a more complete understanding of this invention reference should now be had to the embodiments illustrated in greater detail in the accompanying drawings and described below by way of an example of the invention. In the drawings:

FIG. 5 is a side elevational view of a rearward portion of an agricultural tractor with the left rear wheel and fender removed.

FIG. 6 is a three-dimensional view of the switch assembly mounted to the upper link of the three-point hitch on an agricultural tractor.

FIG. 7 is a side elevational view of the control box for the guidance system.

Figure 1:
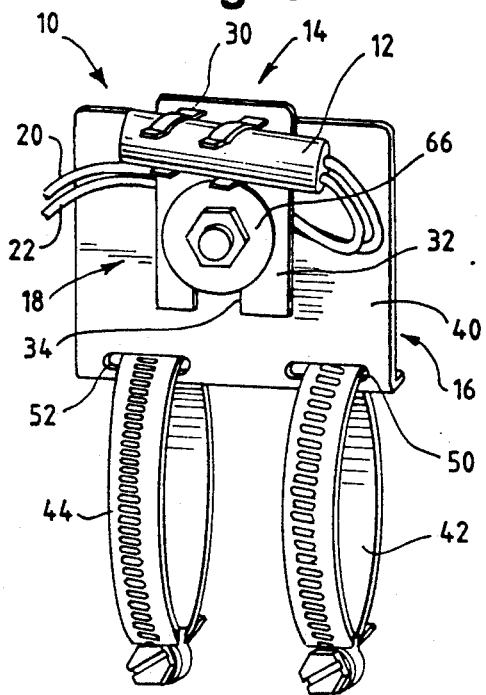
FIG. 1 is a side elevational view of the switch assembly.

It should be understood that the drawings are not necessarily to scale and that an embodiment is sometimes illustrated in part by schematic and fragmentary views. It should be understood, of course, that the invention is not necessarily limited to the particular embodiment illustrated herein.

DESCRIPTION OF THE INVENTION

An agricultural tractor and implement combination is generally shown in FIG. 5. A switch assembly 10 s attached to the upper link 146 of the three-point hitch 118 on an agricultural tractor 110. A guidance mechanism 128 is attached to the three-point hitch 118 and an implement 180 is attached to the guidance mechanism 128. The control box 200 for the guidance system is shown in FIG. 6.

Referring to FIG. 1, the switch assembly is indicated generally by the reference numeral 10. The switch assembly 10 includes a mercury switch 12, a switch support assembly 14, an attachment assembly 16 and an adjustment assembly 18.

The mercury switch 12 is a tilt switch which is designed for horizontal mounting. Switch 12 has two leads 20, 22. Lead 20 is the input lead and lead 22 is the output lead. In this particular embodiment, the switch has mercury-to-mercury contacts. Contact is made between two pools of mercury.

The switch 12 is activated when tilted above the horizontal to its "make" angle. The switch 12 is above the horizontal when the end of the switch without the leads (the "non-lead end") is above the opposite end of the switch with the leads 20, 22 (the "lead end"). The switch is de-activated when tilted below the horizontal to its "break" angle. The switch 12 is below the horizontal when the non-lead end of the switch is below the lead end of the switch. Referring to FIG. 6, the non-lead end is below the lead end of the switch. This particular switch is omnidirectional and rotation around the switch axis does not affect the operation of the switch or change the angle at which the make and break occur.

In this embodiment, the mercury switch 12 is Model G5Z-002 and is available from American Electronic Components, Elkhart, Indiana, U.S.A. The switch 12 has an electrical rating of: 5 amps direct current (DC) at 120 volts; 4 amps direct current (DC) at 240 volts; a contact resistance of 0.003 ohms; a contact to contact standoff voltage of 1500; and a contact to ground standoff voltage of 5000. The switch was previously available from Durakool, Inc. of Elkhart, Ind., U.S.A. as Model G5Z.

The mercury switch is sealed in an insulated plastic case. This plastic case prevents the switch from being contaminated b dirt or other debris. Therefore, the mercury switch is less likely to malfunction due to the dusty conditions of the agricultural environment. Although this particular embodiment utilizes a mercury switch, other switches such as tilt or position switches could be used.

The switch support assembly 14 includes a mounting clip 30 and a support bracket 32. The mercury switch 12 is attached to the switch support assembly 14 by mounting clip 30. The mounting clip 30 has a U-shaped configuration with four legs which extend outward from the clip and grasp the outer perimeter of the mercury switch 12. In this particular embodiment, the mounting clip 30 is Model No. 2023 and is available from American Electronic Components, Elkhart, Ind., U.S.A. The mounting clip 30 was previously available from Durakool, Inc. of Elkhart, Ind., U.S.A. as Model No. 2023 The mounting clip 30 is spot welded or otherwise attached to the support bracket 32. The support bracket 32 has a U-shaped slot 34 in the bottom of the bracket for ease of assembly.

Figure 2:
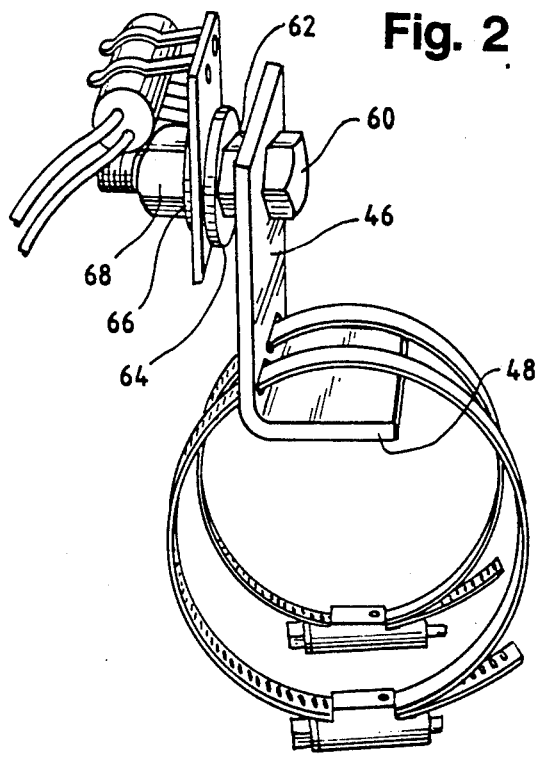
FIG. 2 is a rear elevational view of the switch assembly.
Figure 3:
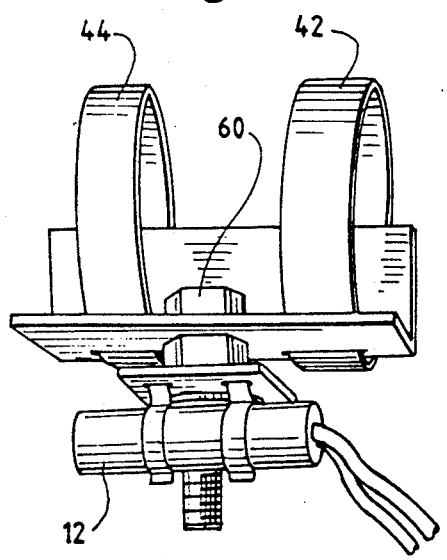
FIG. 3 is a top view of the switch assembly.
Figure 4:
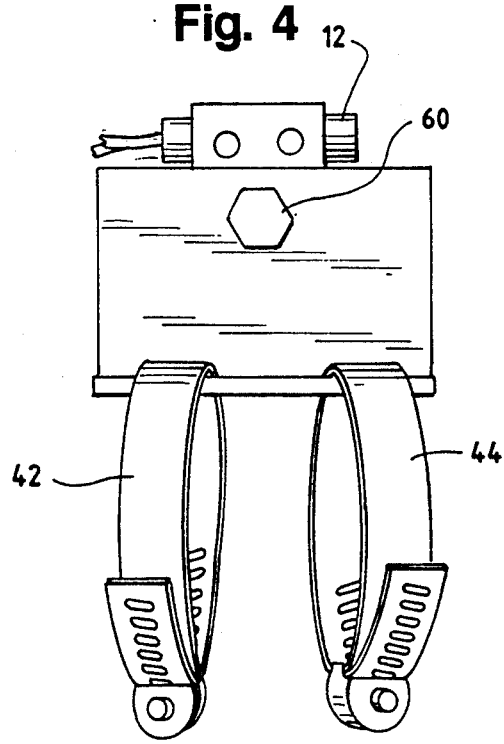
FIG. 4 is a side elevational view of the switch assembly.

The attachment assembly 16 includes a clamp bracket 40, a first hose clamp 42 and a second hose clamp 44. The clamp bracket 40 has an L-shaped configuration with an upright leg 46 and a base portion 48 as shown in FIG. 2. The clamp bracket 40 also contains a first slot 50 and a second slot 52 for accepting the first hose clamp 42 and second hose clamp 44 respectively. The slots are located at the bottom of the clamp bracket 42 near the intersection of the leg 46 with the base 48. The hose clamps 42 and 44 are standard hose clamps which are used in the automotive industry.

The adjustment assembly 18 includes bolt 60, hex nut 62, first flat washer 64, second flat washer 66, and top-lock nut 68. The bolt 60 is a $\frac{3}{8}''$ by 1" bolt which is inserted into a circular aperture (not shown) in clamp bracket 40. The hex nut 62 is a $\frac{3}{8}''$ hex nut which is threaded onto bolt 60 and holds the bolt to the clamp bracket 40. The first flat washer 64 and the second flat washer 66 are inserted onto bolt 60 and the support bracket 32 is sandwiched between the two flat washers 64, 66. The top-lock nut 68 is then threaded onto the bolt 60 and tightened to hold the support bracket 32 in position.

Referring to FIG. 5, an agricultural tractor is indicated generally by the reference numeral 110. The tractor 110 includes an operator's station 112 which is defined by a seat 114 and a front operating console 116. The near side rear wheel has been omitted in FIG. 5 to illustrate various components of the tractor and hitch.

The conventional three-point hitch is indicated generally at 118 and includes a pair of lower lift links 120 which are pivotally connected to the tractor. The rearward ends of lower links 120 have ball joints 126 which may receive pins or lower hitch studs of a directly attached implement or, in the illustrated system, of a guidance mechanism 128. A lift shaft 130 extends laterally from both sides of the power lift casing 132 and is rotated by a hydraulic drive arrangement (not shown) inside casing 132. Lift arms 134 are secured to the outer ends of the lift shaft 130 for movement in a vertical arc upon rotation of shaft 130. The rearward ends of the lift arms 134 are pivotally connected to the lower links 120 by lift links 138.

The three-point hitch 118 also includes a central upper link 146 which is pivotally connected to the tractor at 148. The rearward end of the upper link 146 has a ball joint 150 which receives a pin from a directly attached implement or, in the illustrated system, a guidance mechanism 128. The upper link 146 includes a turnbuckle 154 which is manually rotated to adjust the length of the upper link 146.

As shown in FIG. 5, a console 170 is located adjacent the operator's station 112. The console 170 includes levers as at 172 and 174 for operating hydraulic control valves. Lever 172 operates the control valve for controlling the hydraulic cylinder arrangement for the lift shaft 130. By adjusting the lever 172, the operator is able to raise or lower the lower links 120. Lever 174 operates a control valve for a remote function, in a manner well known to those skilled in the art.

The guidance mechanism 128 changes the angle between the tractor 110 and the implement 180. The implement 180 can include a tool bar 182. In this particular embodiment, an inner frame member pivotally mounted within the horizontal frame member by a vertical pivot pin. As hydraulic cylinders are extended and retracted, the lower frame member pivots on the pivot pin and the lateral angle of the lower frame member with respect to the inner frame member changes to shift slightly the position of the attached implement laterally relative to the tractor. Such a guidance mechanism is shown in U.S. Pat. No. 5,029,650 filed on Oct. 20, 1989 by applicant Edward Smit, which has issued as U.S. Pat. No. 5,029,650 and is incorporated herein by reference.

Referring to FIG. 6, the switch assembly 10 is mounted to the upper link 146 of the three-point hitch on the agricultural tractor. Specifically, the clamp bracket 40 is clamped to the turnbuckle 154 of the upper link with the first hose clamp 42 and second hose clamp 44. The clamp bracket 40 should be attached with the two slots 50, 52 at the bottom of the clamp bracket 40 in order to accept the clamps 42, 44. This arrangement will hold the clamp bracket 40 perpendicular to the upper link 146. In addition, the base portion 48 of the clamp bracket should be attached so that the underside of the base is in contact with the turnbuckle 154. The clamp bracket 40 should be installed with the leg 46 in a vertical plane in order to insure proper operation of the mercury switch 12.

The switch assembly 10 can also be attached to other portions of the three-point hitch including one of the lower links 120, such as indicated at 10a in phantom lines in FIG. 5. In addition, the switch assembly 10 could be attached to a portion of the guidance mechanism 128, such as indicated at 10b in FIG. 5, or to a portion of the implement 180, such as indicated at 10c in FIG. 5, which intrinsically has a change in position between the raised position and the lowered or operating position.

Referring to FIG. 7, the control box for the guidance system is indicated generally by reference numeral 200. The control box 200 is usually positioned in the operator's station 112 on the front operating console 116. The incoming power line connector 201 supplies 12 volt battery power to the control box. The fuse holder 202 contains a four amp fuse for the control box. The power switch 203 has on and off positions and allows the operator to activate and deactivate the control system.

A display panel underneath the power switch contains a wand sensor indicator light 204 and a hitch sensor indicator light 205. The wand sensor indicator light 204 remains on when there is a satisfactory cable light 205 remains on when there is an adequate cable connection to the hitch sensor. The wand sensor and the hitch sensors are described and shown in U.S. Pat. No. filed on Apr. 27, 1990 by applicant Michael L. Moore, which has issued as U.S. Pat. No. 5,103,917 and is incorporated herein by reference.

The switch 206 allows the operator to switch between the manual position mode and the automatic position mode. When the control box is in the manual position mode, the guidance mechanism 128 follows the movement of the manual knob 207. By rotating the knob 207 the operator is able to move the guidance mechanism 128 so that the implement 180 moves to the left or right. By placing the knob 207 in the center position, the operator is able to center the guidance mechanism 128. When the control box is in the automatic position mode, the guidance mechanism 128 follows the movement of the sensing wands. By rotating the automatic knob 208 to the left or right the operator is able to provide left or right tracking adjustment to the guidance mechanism 128.

The movement knob 209 allows the operator to control the amount of guidance mechanism movement in relationship to the sensing wand movement. When the movement knob 209 is set to the lowest position or zero position, there is no movement in the guidance mechanism 128. When the movement knob 209 is set to the maximum position or position 10, the guidance mechanism 128 is allowed the maximum amount of movement. The hitch control cable connector 210 connects the cable from the hitch sensor to the control box 200.

The position monitor 211 contains a needle 211a which indicates the relative angular position of the hitch guidance mechanism 128 or the wands depending upon the setting of the position monitor toggle switch 212. By switching the position monitor toggle switch 212 to the wand position, the needle 211a on the position monitor 211 will indicate the position of the wands. When the position monitor toggle switch 212 is switched to the guidance mechanism (hitch) position, the position monitor 211 will indicate the position of the guidance mechanism 128. The normal operating position for the position monitor toggle switch is to monitor the guidance mechanism 128.

The left valve indicator light 213 is on only when the left side of the guidance mechanism 128 is pivoting away from the rear of the tractor. The right valve indicator light 214 is on only when the right side of the guidance mechanism 128 is pivoting away from the rear of the tractor. The power indicator light 215 indicates when the control box is receiving power from the power source and that the control system is switched "on". The manual indicator light 216 remains on when the control system is in the manual position mode. The automatic indicator light 217 remains on when the control system is in the automatic position mode.

The input lead 20 and the output lead 22 are connected from the mercury switch 12 at the rear of the tractor to the override switch box 230. The input lead 20 is connected to the override switch 206 and then continues to the control box 200 through connector 220. The output lead 22 is run through the switch box 230 but is not connected to the override switch 206. The output lead 22 continues through the switch box 230 and is connected to the control box 200 by connector 220.

The operator must adjust the angle of the mercury switch 12 so that the control system will operate in the automatic mode when the hitch is lowered and in the manual mode when the hitch is raised, and will switch from the automatic mode to manual mode at an appropriate point in the raise-lower movement of the threepoint hitch. In order to determine the appropriate angle of the mercury switch 12, the operator must determine the full up position of the three-point hitch and the full down position of the three-point hitch. Then the operator must determine the approximate half-way position between the full up and full down positions. The angle of the mercury switch 12 should be such that when the three-point hitch is about half way between the full up and full down positions, the mercury switch 12 is switching the control box 200 from the manual mode 216 to the automatic mode 217. Once the appropriate angle of the mercury switch 12 is established, the top lock nut 68 can be tightened to hold the switch assembly 14 and the mercury switch 12 in the proper position.

If the operator needs to change the position when the control system switches from the automatic mode to manual mode, the operator simply loosens the lock nut 68 and changes the angle of the mercury switch 12 and the switch support assembly 14 to the appropriate angle. The operator then tightens the lock nut 68 to maintain the mercury switch 12 and the switch support assembly 14 in the appropriate position.

The switch assembly 10 operates in the following manner. When the operator reaches the end of the field, the operator raises the three-point hitch 118, including the guidance mechanism 128 and the implement 180, by adjusting lever 172 which is located in the operator's station 112 on the tractor. As the three-point hitch raises the guidance mechanism 128 and the attached implement 180, the angle of the switch assembly 10 changes.

When the three-point hitch is approximately half way between the full up and full down positions, the mercury switch 12 will automatically switch the control system between the automatic mode 217 to the manual mode 216. When the guidance system switches to the manual mode 216, the position of the guidance mechanism 128 will correspond to the position of the manual knob 207. Normally, the operator will position the manual knob 207 in the center position so that the guidance mechanism 128 will move to the center position.

After the operator has turned the tractor and the implement, the operator lowers the three-point hitch 118, including the attached guidance mechanism 128 and implement 180, by adjusting lever 172. When the threepoint hitch is approximately half way between the full up and full down position, the mercury switch 12 automatically switches the guidance system from the manual mode 216 to the automatic mode 217 to begin the next pass through the field. While the three-point hitch is in the lowered position and the guidance system is in the automatic mode 217, the operator may use the override switch 206 to override the automatic mode 217 so that the control system will operate in the manual mode 216.

With this invention, the guidance control switch system automatically switches between the automatic mode and manual modes when the three-point 118 hitch is raised or lowered. Furthermore, this invention provides a switching assembly 10 which is reliable and will not malfunction due to contamination by dirt or debris. Finally, this switch assembly 10 is easy to adjust since it only requires the operator to loosen the lock nut 68 which is easily accessible to the operator.

While specific embodiments of the invention have been shown and described, it will be understood, of course, that the invention is not limited thereto, since modifications may be made and other embodiments of the principles of this invention will occur to those skilled in the art to which this invention pertains. Therefore, it is contemplated by the appended claims to cover any such modifications and other embodiments as incorporate the features of this invention within the true spirit and scope of the following claims.

What is claimed is:

1. A guidance system for an implement and a vehicle including a hitch system which has at least two lower links and at least one upper link for coupling to implements comprising a guidance means for adjusting the relative lateral position between the hitch system of the vehicle and the implement, a sensing means for sensing the position of plants or other ground reference indicia, a control means having an automatic mode for controlling the position of said guidance means in response to said sensing means and a second mode for manually controlling the position of said guidance means, and a switch means for transmitting an electronic signal to the control means to switch said control means between the automatic mode and the second mode when the hitch system is raised or lowered by sensing the position of said hitch system relative to said vehicle.

2. The invention as in claim 1 wherein said switch means is a tilt or position switch.

3. The invention as in claim 1 wherein said switch means is a mercury switch.

4. The invention as in claim 1 wherein said switch means is attached to said hitch system of said vehicle.

5. The invention as in claim 4 wherein said switch means is attached to at least one upper link of said hitch system.

6. The invention as in claim 5 wherein said switch means is a mercury switch.

7. The invention as in claim 4 wherein said switch means is attached to one of said at least two lower links.

8. The invention as in claim 1 wherein said switch means is sealed to prevent dirt and debris from interfering with the operation of the switch means.

9. The invention as in claim 1 wherein said switch means comprises an adjustment means for adjusting the angle of said switch means.

10. The invention as in claim 1 wherein said switch means comprises a mercury switch, a switch support means for supporting said mercury switch, an attachment means for attaching said switch to said hitch system and an adjustment means for adjusting the angle of said switch support means relative to said attachment means.

11. The invention as in claim 1 wherein said switch means is attached to said implement.

12. The invention as in claim 11 wherein said switch means is attached to the toolbar of said implement.

13. The invention as in claim 1 wherein said switch means is attached to said guidance means.

14. A switch in an agricultural implement guidance system which system has a guidance means for adjusting the relative lateral position between a vehicle and an implement attached to said vehicle by a vertically adjustable hitch system, a sensing means for sensing the position of plants or other ground reference indicia, a control means having an automatic mode for controlling the position of said guidance means in response to said sensing means and a second mode for manually controlling the position of said guidance means, said switch comprising a switch means for transmitting an electronic signal to the control means to switch said control means between the automatic mode and the second mode when the hitch system is raised or lowered by sensing the position of said hitch system relative to said vehicle.

15. The invention as in claim 14 wherein said switch means is a tilt or position switch.

16. The invention as in claim 14 wherein said switch means is a mercury switch.

17. The invention as in claim 14 wherein said switch means is attached to said hitch system of said vehicle.

18. The invention as in claim 17 wherein said hitch system includes at least one upper link and said switch means is attached to at least one upper link of said hitch system.

19. The invention as in claim 18 wherein said switch means is a mercury switch.

20. The invention as in claim 17 wherein said hitch system includes at least two lower links and said switch means is attached to one of said at least two lower links.

21. The invention as in claim 14 wherein said switch means is sealed to prevent dirt and debris from interfering with the operation of the switch means.

22. The invention as in claim 14 wherein said switch means comprises an adjustment means for adjusting the angle of said switch means.

23. The invention as in claim 14 wherein said switch means comprises a mercury switch, a switch support means for supporting said mercury switch, an attachment means for attaching said switch to said hitch system and an adjustment means for adjusting the angle of said switch supporting means relative to said attachment means.

24. The invention as in claim 14 wherein said switch means is attached to said implement.

25. The invention as in claim 24 wherein said switch means is attached to the toolbar of said implement.

26. The invention as in claim 14 wherein said switch means is attached to said guidance means.

* * * * *

UNITED STATES PATENT AND TRADEMARK OFFICE
CERTIFICATE OF CORRECTION

PATENT NO. : 5,224,551
DATED : July 6, 1993
INVENTOR(S) : Charles E. Sukup

It is certified that error appears in the above-indentified patent and that said Letters Patent is hereby corrected as shown below:

Col. 5, line 25, delete "s" and substitute therefore --is--;

Col. 5, line 68, delete "b" and substitute therefore --by--;

Col. 7, line 24, delete "U.S. Pat. No. 5,029,650" and substitute therefor --U.S. Patent Application Serial No. 07/424,701

Col. 7, line 64, add --connection to the wand sensor. The hitch sensor indicator--; and Col. 7, line 67, delete "Pat. No." and substitute therefor --Patent Application Serial No. 07/516,035

Signed and Sealed this

Twenty-second Day of March, 1994

Attest:

BRUCE LEHMAN

*Attesting Officer*         *Commissioner of Patents and Trademarks*